United States Patent [19]

Olson

[11] Patent Number: 5,671,938
[45] Date of Patent: Sep. 30, 1997

[54] IMPLEMENT HITCH

[76] Inventor: Brian R. Olson, 3018 Gordon Rd., Regina, Saskatchewan, Canada, S4S 2T8

[21] Appl. No.: 723,637

[22] Filed: Oct. 3, 1996

Related U.S. Application Data

[63] Continuation of Ser. No. 492,568, Jun. 20, 1995, abandoned.

[51] Int. Cl.$^6$ .................................................. B60D 1/02
[52] U.S. Cl. ......................... 280/515; 280/416.1; 280/506
[58] Field of Search .................................. 280/504, 515, 280/506, 415.1, 416.1

[56] References Cited

U.S. PATENT DOCUMENTS

| | | | |
|---|---|---|---|
| 1,281,049 | 10/1918 | Menhall et al. | 280/513 |
| 1,875,969 | 9/1932 | Weiss | 280/506 |
| 2,270,569 | 1/1942 | Weiss | 280/506 |
| 2,321,535 | 6/1943 | Weiss | 280/506 |
| 2,360,335 | 10/1944 | Fink | 280/506 |
| 2,371,662 | 3/1945 | Winters | 280/506 |
| 2,522,791 | 9/1950 | Ketel | 280/506 |
| 2,677,574 | 5/1954 | Phillips | 298/38 |
| 2,984,502 | 5/1961 | Tyrrell | 280/506 |
| 3,061,334 | 10/1962 | Everett et al. | 280/515 |
| 3,350,117 | 10/1967 | Kassmeier | 280/515 |

FOREIGN PATENT DOCUMENTS

| | | | |
|---|---|---|---|
| 934 742 | 10/1955 | Germany | 280/515 |
| 934742 | 11/1955 | Germany . | |

*Primary Examiner*—Kevin Hurley
*Attorney, Agent, or Firm*—Murray E. Thrift; Adrian D. Battison

[57] ABSTRACT

An implement hitch system is intended to be mounted on the tongue of a towed vehicle. The hitch has a hitch body with a standard ring coupling. A ring adapter can be mounted on the hitch body to adjust the size of the ring opening to accommodate draw pins of different sizes. The adjustment includes a resilient backstop that cushions the hitch and minimizes chattering. The system also includes a clevis attachment for the hitch that bolts onto the hitch body to provide a clevis type hitch for engaging a single tractor drawbar. An additional feature is a wear plate that may be bolted onto the ring to accommodate high vertical loads.

17 Claims, 4 Drawing Sheets

IMPLEMENT HITCH

This application is a continuation Ser. No. 08/492,568, filed Jun. 20, 1995 now abandoned.

FIELD OF THE INVENTION

The present invention relates to implement hitches for towed agricultural implements.

BACKGROUND

In using a draw pin hitch, it is often difficult to find a proper match between the hitch on the towed implement and the drawbar on the tractor. The components may not match in type. Single and clevis drawbars and single tongue, clevis and ring implement hitches may be incompatible. Where the hitch and drawbar are compatible types, the pins for the two are rarely of the same size. The size of the tractor draw pin depends on the pulling power of the tractor, while the size of the implement draw pin hole depends largely on the draft of the implement. These factors do not often match, so that the same size pin is rarely called for. Frequently, the result is that the tractor draw pin, being too large for the tongue to hold, it is not used and something smaller is used, often a bolt. Bolts are not made of the high strength material required for a draw pin, so that bolt breakage does occur, releasing the implement. The operator has no securing mount for the bolt, the bolt may work its way loose out of the hitch, unhooking the implement while in motion. This is a dangerous situation with a potential for very costly damage.

Where the draw pin and the draw pin hole are not a close fit, the draw pin may slap around in the hole, applying shock loadings on the draw pin and the tractor drive line, leading to wear and potential draw pin breakage.

The present invention addresses these concerns.

SUMMARY

According to the present invention there is provided a hitch for receiving a draw pin comprising:

a hitch body including a hitch ring and means for mounting the hitch ring on a tongue of a towed vehicle;

a ring adapter for adjusting the size of the hitch ring to accommodate draw pins of different sizes, the ring adapter including a back stop member, means for mounting the back stop member on the hitch body with the restricting member extending into the ring from one side thereof and forming a draw pin opening between the restricting member and the ring, and adjustment means for selectively positioning the restricting member across the ring; and a clevis attachment including top and bottom clevis arms with aligned draw pin holes, and means for mounting the clevis attachment on the hitch body with one of the clevis arms extending into the ring from said one side thereof.

The hitch body may be used alone as a ring hitch. With the ring adapter in place, it may accommodate a range of draw pin sizes so that the mismatch can be avoided. With a single drawbar, requiring a clevis hitch, the clevis attachment is used.

From the point of view of the manufacturer or dealer, this hitch allows the supply of a suitable hitch with a minimal increase in parts to be supplied or maintained in inventory. For the user, the system provides a simple, effective mechanism for ensuring that a proper coupling is made at all times.

The ring of the hitch body may be matched to the ISO standard for pintle hook rings. This means that the hitch can be used for almost any implement in any environment, either agricultural or industrial. It can be coupled to a pintle hook or a draw pin of almost any size.

In the preferred embodiments of the invention there is a recess in the hitch body, oriented substantially radially with respect to the ring. The back stop and the one clevis arm are engageable in the recess. This provides a simple and accurate method of aligning and fastening the attachments on the hitching body.

The back stop may be slideable in the recess. One or more blocks of resilient material may be engageable between the back stop and an outer end of the recess to provide an elastic resistance to movement of the back stop into the recess, radially outwardly from the ring. Where plural blocks are used, they can serve as the adjustment mechanism. The back stop can be set to accommodate most any size of draw pin by positioning it appropriately along the first component. With the resilient cushioning, the second component is held against the draw pin by a pressure that stops slapping of a loose draw pin and cushions impacts when the implement moves forward. The cushioning allows the hitch to flex when crossing rough terrain, but keeps the connection tight.

The back stop may have a convex end face, preferably V-shaped, confronting the ring, for centering small draw pins. It may also be convex in cross section to accommodate the pitch and roll movements encountered.

The hitch may also include a wear plate attachment with a draw pin hole, and means for mounting the wear plate attachment on the hitch body with the draw pin hole in alignment with the ring. With large vertical loads, the wear pin will wear out before the hitch body and can be replaced at a reasonable cost.

BRIEF DESCRIPTION THE DRAWINGS

In the accompanying drawings which illustrates exemplary embodiment of the present invention:

DETAILED DESCRIPTION

Figure 1:
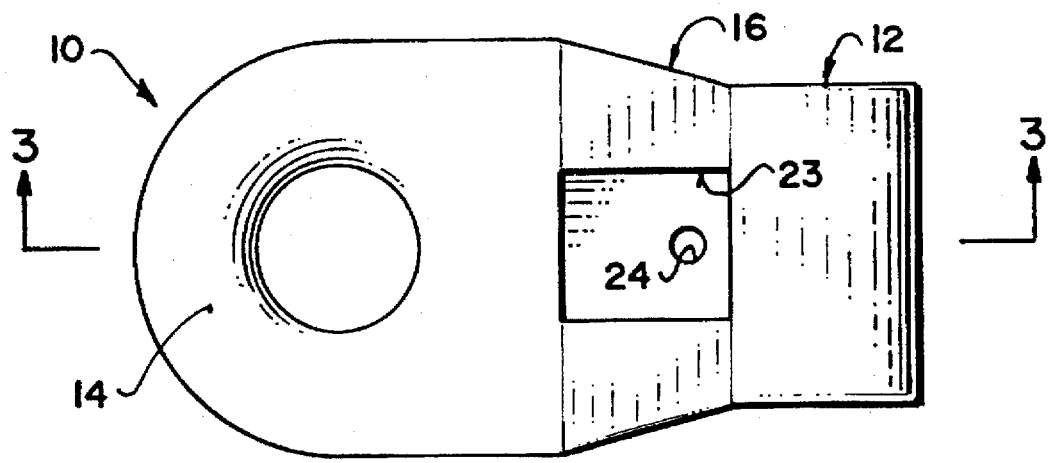
FIG. 1 is a top view of a hitch body according to the present invention.
Figure 2:
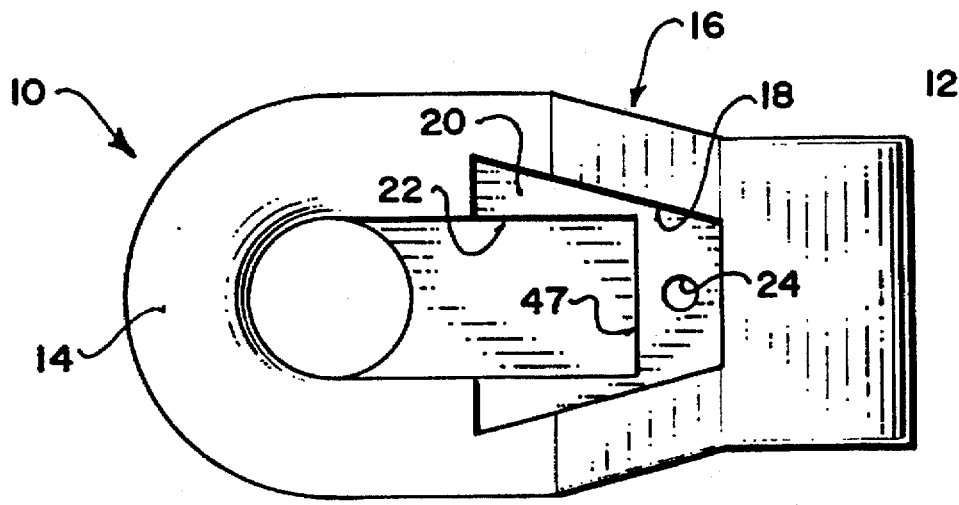
FIG. 2 is a bottom view of a hitch body according to the present invention.
Figure 3:
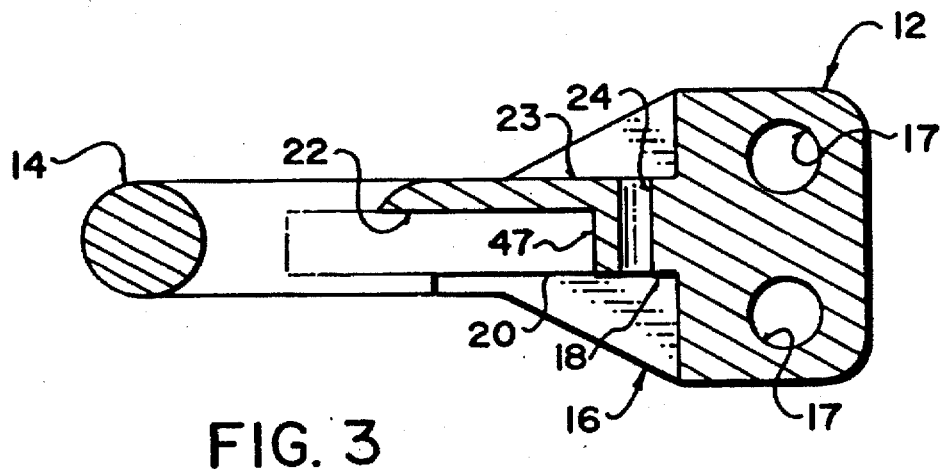
FIG. 3 is a cross section along line 3—3 of FIG. 1.

Referring to the accompanying drawings, there is illustrated a hitch body 10 with a block-like mounting end 12 and a circular ring 14 projecting to the front of the mounting end. A transition section 16 tapers vertically and flares laterally from the block to the ring. This body may be mounted on an implement tongue using bolts through cross holes 17 in the mounting end. The ring 14 is sized to meet the standards for ring hitches and may be used alone as a ring type hitch.

In the bottom of the transition section and extending forwardly towards the ring is a recess 18 with the outline shape of a regular trapezium. The recess has a planar base 20. A second recess 22 is formed in the base of the recess 18. Recess 22 is of rectangular outline. On the top of the hitch body is a rectangular recess 23. A bolt hole 24 extends through the body 10, between the recesses 18 and 23 to accommodate an assembly bolt that will be discussed more fully in the following.

Figure 4:
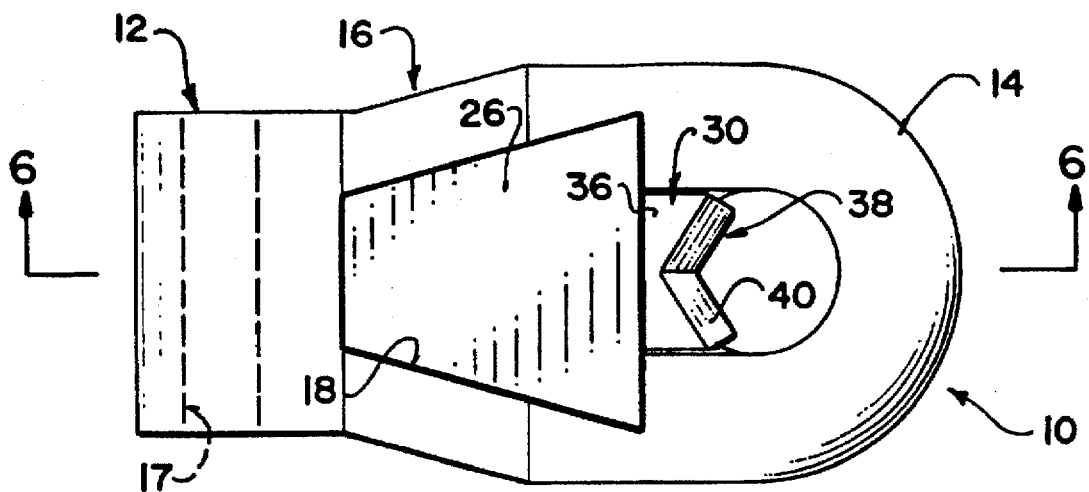
FIG. 4 is a plan view of the hitch body with the ring adapter in place.
Figure 5:
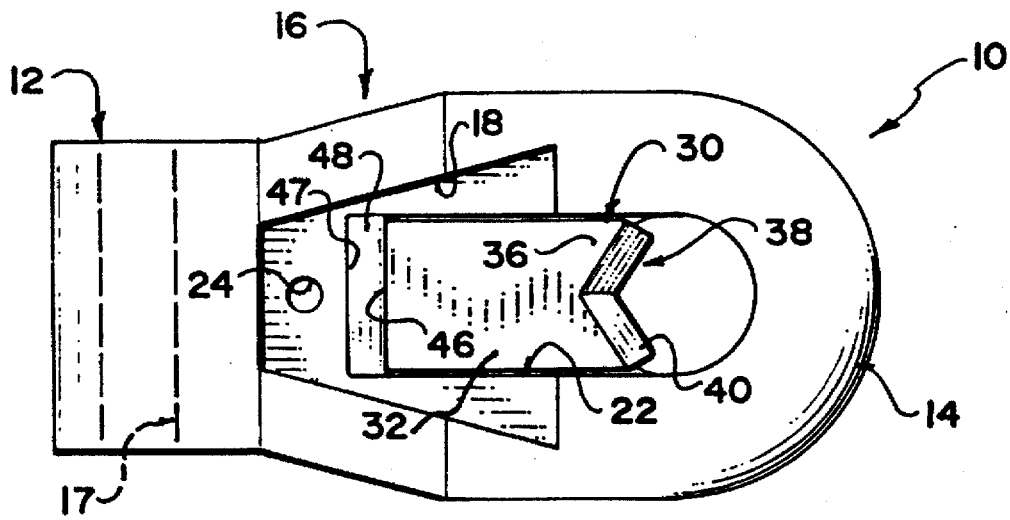
FIG. 5 is a view like FIG. 4 with the cover removed.
Figure 6:
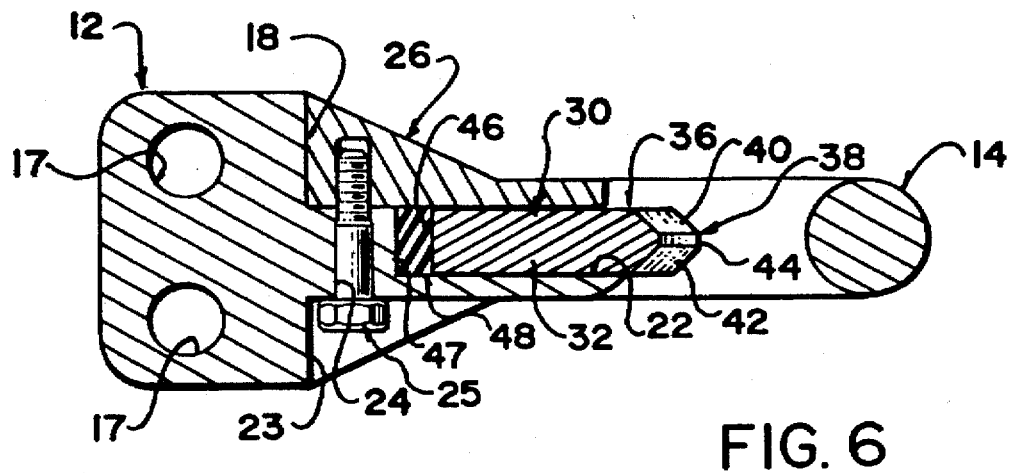
FIG. 6 is a cross section along line 6—6 of FIG. 4.

A ring adapter is most particularly illustrated in FIGS. 4, 5 and 6. As illustrated, the hitch body is inverted so that the recess 18 is on the top. A cover 26 conforming to the outline shape of the recess 18 is set into the recess to be held in place by the assembly bolt 28. A back stop 30 is set into the recess 22, under the cover 26. This is a plate 32 with a rectangular body and a front end section 36 extending into the ring 14. The front end 38, confronting the ring, has a concave, V-shape. In cross section the front end has a convex, V-shape with a top face 40 and a bottom face 42 meeting at a centre, narrow, vertical face 44. In this case, the faces 40 and 42 are substantially symmetrical so that the vertical face 44 is positioned generally in the centre of the plate 32.

The back end 46 of the back stop 30 engages a resilient spacer 48 that seats in turn against a vertical face 47 at the back of the recess 22. The position of the back stop 30 relative to the ring 14 can be adjusted using different sizes or numbers of spacers 48, thus adjusting the ring size.

The back stop 30 is held captive in the hitch body by the cover 26, which is in turn retained in place by the bolt 28 threaded into a bore in the cover.

With this hitch, the tractor draw pin can always be used because the draw pin hole between the front end 38 of the back stop 30 and the ring 14 can be adjusted to match the size of the draw pin. Because the proper draw pin for the tractor is always used, the risk of breakage is considerably reduced.

The implement hitch, by engaging the draw pin between the back stop and the ring, tends to secure the draw pin to prevent it from working out of the hitch.

The connection between the tractor and the implement is a cushioned, flexible connection that minimizes shock loadings on draw pins and reduces stress on drive lines. The hitch can be expected to save costs because a single style of hitch can be used for all implements.

As noted above, the ring 14 is configured to match the ISO standard for pintle hook rings. The ring type design thus matches those used on industrial trailers and is applicable to both industrial and agricultural type hitches. The hitch can be connected to a pintle hook. While the hitch has been described in terms of a single size ring matching the ISO standard for pintle hook rings, it will be apparent to those skilled in the art that the different sizes can be manufactured to accommodate different load categories while still allowing the use of the tractor draw pin that is matched to the drawbar of the tractor.

Figure 7:
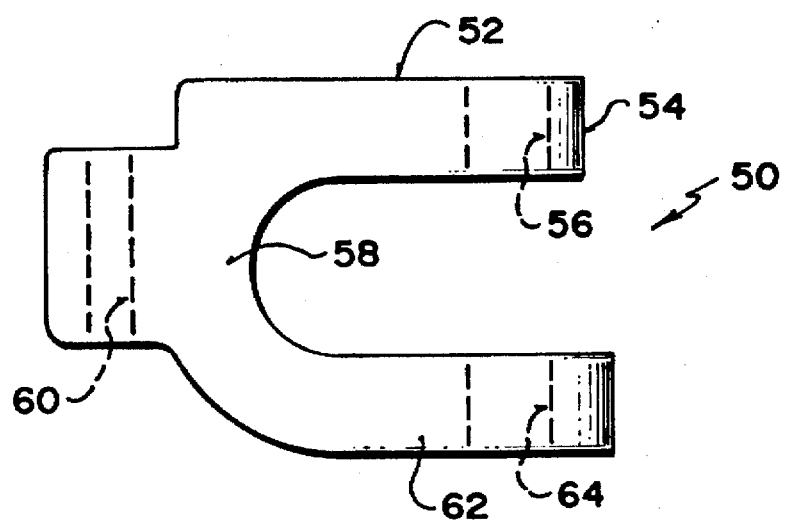
FIG. 7 is a side view of a clevis attachment.
Figure 8:
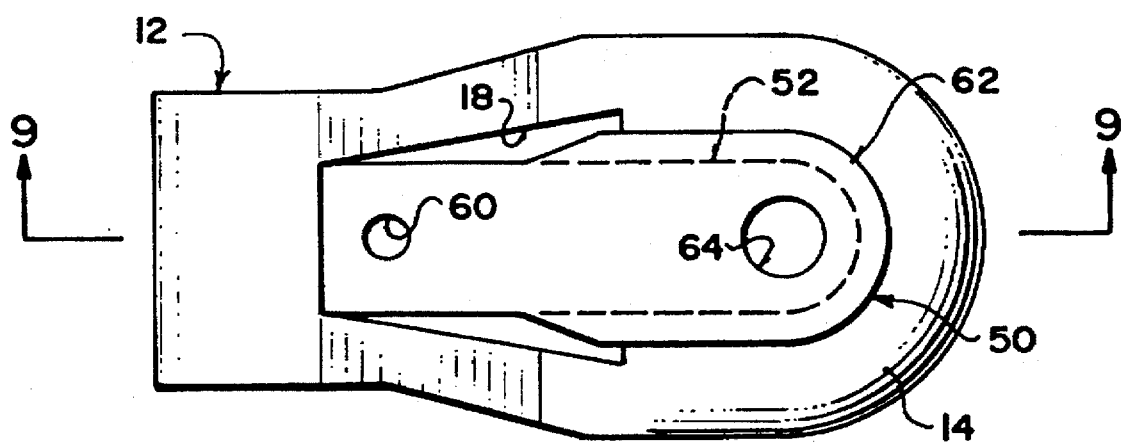
FIG. 8 is a plan view of the hitch body with the clevis attachment in place.
Figure 9:
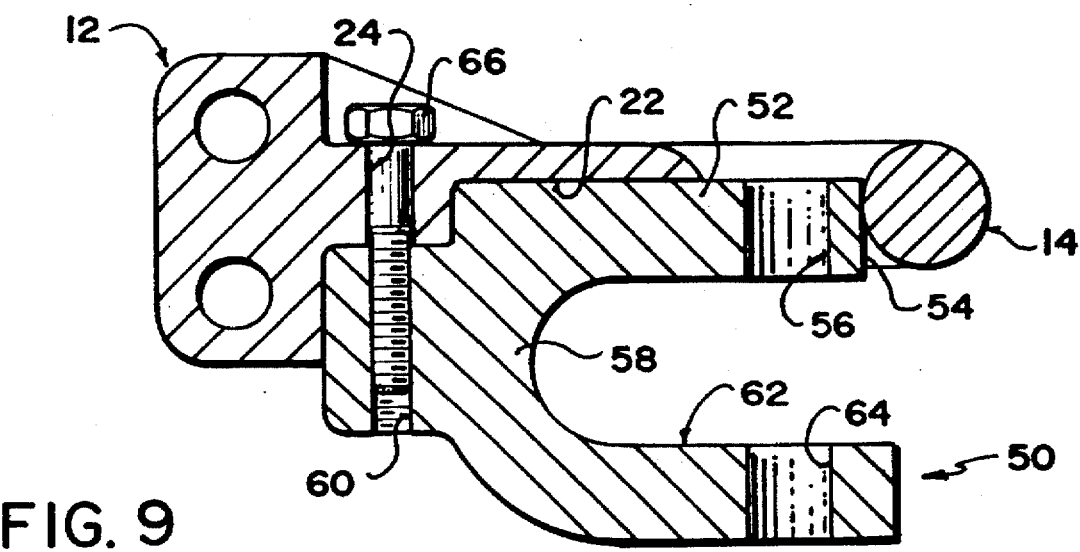
FIG. 9 is a cross section along line 9—9 of FIG. 8.

FIGS. 7, 8 and 9 illustrate a clevis attachment 50 for the hitch body. The clevis attachment includes a top arm 52 that is generally rectangular in shape and seats into the recess 22 in the hitch body. The arm projects forwardly and has a round forward end 54 that engages the inside of the ring 14. A draw pin hole 56 extends through the arm 52. At the back end of the clevis attachment is a body 58 that extends into the hitch body recess 18. A bolt hole 60 in the clevis body aligns with the bolt hole 24 in the hitch body. A bottom arm 62 projects forwardly from the clevis body below the arm 52. The bottom arm has a draw pin hole 64 aligned with the draw pin hole 56 of the top arm. The clevis attachment is held in place using a bolt 66 through the bolt hole 24 and threaded into the bolt hole 60.

Figure 10:
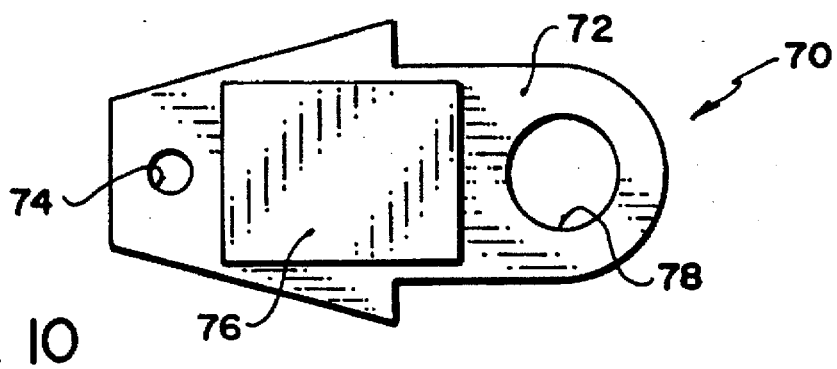
FIG. 10 is a plan view of the wear plate attachment.
Figure 11:
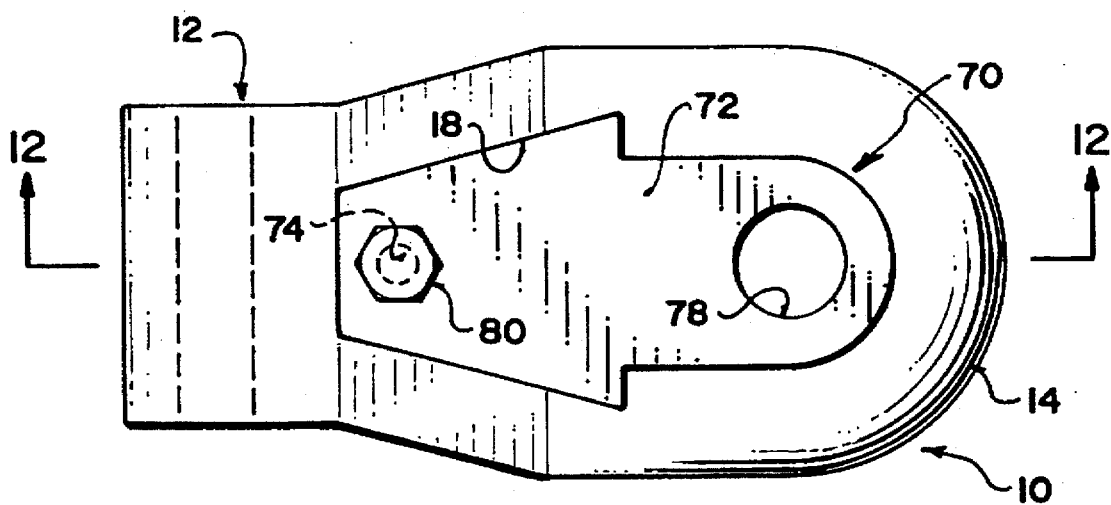
FIG. 11 is a bottom view of the hitch body with the wear plate in place.
Figure 12:
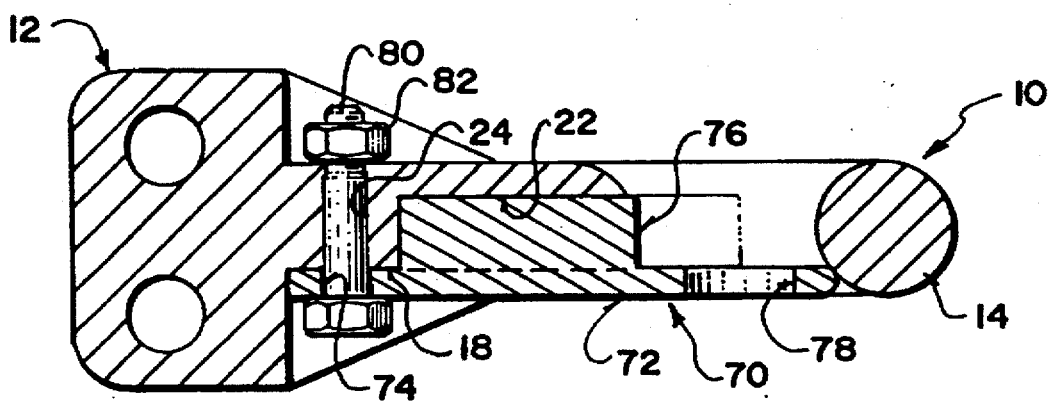
FIG. 12 is a view along line 12—12 of FIG. 11.

A wear plate attachment for the hitch body is illustrated in FIGS. 10, 11 and 12. The attachment 70 includes a flat plate 72 that seats in the hitch body recess 18 and extends across the ring 14. A bolt hole 74 in the wear plate aligns with the bolt hole 24 of the hitch body. A block 76 on the top of the wear plate engages in the recess 22. A draw pin hole 78 through the wear plate is centered on the ring 14. The wear plate is held in place with a bolt 80 through the bolt holes 74 and 24 and a nut 82. The wear plate is used where large vertical loads can be anticipated. It is replaceable at a reasonable cost instead of replacing the whole hitch.

The hitching system described in the foregoing is a comprehensive hitching system that provides a base hitch body that can be equipped with various attachments to suit it to different hitching needs. This reduces cost to the manufacturer, distributor and dealer while reducing the cost and complexity to the ultimate consumer.

While particular embodiments of the invention have been described in the foregoing, it is to be understood that other embodiments are possible and are intended to be included within the scope of the appended claims.

I claim:

1. A hitch for receiving a draw pin comprising:
   a hitch body including a hitch ring and means for mounting the hitch ring on a tongue of a towed vehicle;
   a ring adapter for adjusting the size of the hitch ring to accommodate draw pins of different sizes, the ring adapter including
      a back stop member,
      means for mounting the back stop member on the hitch body with the back stop member extending into the ring from one side thereof and forming a draw pin opening between the restricting member and the ring, and
      adjustment means for selectively positioning the restricting member across the ring; and
   a clevis attachment including
      top and bottom clevis arms with aligned draw pin holes, and
      means for mounting the clevis attachment on the hitch body with one of the clevis arms extending into the ring from said one side thereof.

2. A hitch according to claim 1 including a recess in the hitch body, oriented substantially radially with respect to the ring, the back stop member and said one of the clevis arms being alternatively engageable in the recess.

3. A hitch according to claim 2 wherein the back stop member is slideably engageable in the recess.

4. A hitch according to claim 3 including resilient means yieldably resisting movement of the back stop member into the recess, radially outwardly from the ring.

5. A hitch according to claim 4 wherein the resilient means comprise a block of resilient material engageable between the back stop member and an outer end of the recess.

6. A hitch according to claim 5 wherein the adjustment means comprise a plurality of blocks of said resilient material.

7. A hitch according to claim 1 further comprising a wear plate attachment having a draw pin hole therethrough and means for mounting the wear plate attachment on the hitch body with the draw pin hole in alignment with the ring.

8. A hitch according to claim 7 including a recess in the hitch body, oriented substantially radially with respect to the ring, the back stop member, said one of the clevis arms and the wear plate being alternatively engageable in the recess.

9. A hitch according to claim 8 wherein the back stop member is slideably engageable in the recess.

10. A hitch according to claim 9 including resilient means yieldably resisting movement of the back stop member into the recess, radially outwardly from the ring.

11. A hitch according to claim 10 wherein the resilient means comprise a block of resilient material engageable between the back stop member and an outer end of the recess.

12. A hitch according to claim 11 wherein the adjustment means comprise a plurality of blocks of said resilient material.

13. A hitch according to claim 1 wherein the back stop member has a concave front end confronting the inside of the ring.

14. A hitch according to claim 13 wherein the front end of the back stop member has a convex shape in cross section.

15. A hitch according to claim 13 wherein the front end of the back stop member is V-shaped.

16. A hitch according to claim 15 wherein the front end of the second component has a convex shape in cross section.

17. A hitch according to claim 15 wherein the front end of the second component is V-shaped in cross section.

* * * * *